(12) United States Patent
Zhan et al.

(10) Patent No.: US 11,255,188 B2
(45) Date of Patent: Feb. 22, 2022

(54) LOGGING TOOL WITH 4D PRINTED SENSING SYSTEM

(71) Applicant: Saudi Arabian Oil Company, Dhahran (SA)

(72) Inventors: Guodong Zhan, Dhahran (SA); Chinthaka P. Gooneratne, Dhahran (SA); Bandar Salem AlMalki, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 33 days.

(21) Appl. No.: 16/864,507

(22) Filed: May 1, 2020

(65) Prior Publication Data

US 2021/0340866 A1    Nov. 4, 2021

(51) Int. Cl.
| | |
|---|---|
| *E21B 49/00* | (2006.01) |
| *E21B 47/07* | (2012.01) |
| *E21B 47/06* | (2012.01) |
| *E21B 49/08* | (2006.01) |
| *G01V 3/26* | (2006.01) |
| *G01V 9/00* | (2006.01) |

(52) U.S. Cl.
CPC .............. *E21B 49/00* (2013.01); *E21B 47/06* (2013.01); *E21B 47/07* (2020.05); *E21B 49/08* (2013.01); *G01V 3/26* (2013.01); *G01V 9/005* (2013.01)

(58) Field of Classification Search
CPC .......... E21B 47/06; E21B 47/07; E21B 49/00; E21B 49/08; G01V 3/26; G01V 9/006
See application file for complete search history.

(56) References Cited

U.S. PATENT DOCUMENTS

| | | | | | |
|---|---|---|---|---|---|
| 5,199,497 | A | * | 4/1993 | Ross | ....................... E21B 23/01 166/381 |
| 5,215,145 | A | * | 6/1993 | Ross | ....................... E21B 23/01 166/217 |
| 5,273,116 | A | * | 12/1993 | Ross | ....................... E21B 23/01 166/196 |

(Continued)

FOREIGN PATENT DOCUMENTS

CN          11409284 A   *   7/2020

OTHER PUBLICATIONS

Sireesha et al. "A review on additive manufacturing and its way into the oil and gas industry," RSC Adv. 8, pp. 22460-22468 (Year: 2018).*

(Continued)

*Primary Examiner* — John Fitzgerald
(74) *Attorney, Agent, or Firm* — Choate, Hall & Stewart LLP; Charles E. Lyon; Peter A. Flynn

(57) ABSTRACT

An example system for operation in a borehole in a hydrocarbon-bearing rock formation includes a logging tool for detecting one or more conditions in the borehole. The logging tool includes a tool body and a 4D printed sensing element. The 4D printed sensing element includes a 3D printed shape-memory material configured to alter in at least one spatial dimension in response to one or more stimuli, thereby generating a data signal. The example system includes a data recording device in communication with the logging tool to receive and record one or more data signals transmitted from the logging tool.

20 Claims, 9 Drawing Sheets

(56) References Cited

U.S. PATENT DOCUMENTS

| | | | | |
|---|---|---|---|---|
| 6,216,779 | B1* | 4/2001 | Reinhardt | E21B 17/1021 166/57 |
| 6,647,637 | B2* | 11/2003 | Lechen | E21B 47/08 33/542.1 |
| 7,884,951 | B2* | 2/2011 | Prouvost | E21B 47/08 356/626 |
| 7,975,541 | B2* | 7/2011 | Large | E21B 47/002 73/152.57 |
| 8,159,114 | B2* | 4/2012 | Rahman | E21B 34/066 310/328 |
| 8,659,209 | B2* | 2/2014 | Rahman | H02N 2/023 310/328 |
| 9,382,785 | B2* | 7/2016 | Wells | E21B 29/10 |
| 10,941,647 | B2* | 3/2021 | Grubb | G01F 1/684 |
| 10,989,041 | B2* | 4/2021 | Cromar | E21B 47/00 |
| 11,130,847 | B2* | 9/2021 | Zhou | C08J 5/18 |
| 2010/0308689 | A1* | 12/2010 | Rahman | E21B 23/00 310/328 |
| 2012/0055711 | A1* | 3/2012 | Brannigan | E21B 47/08 175/50 |
| 2012/0217845 | A1* | 8/2012 | Rahman | E21B 41/00 310/328 |
| 2014/0138084 | A1* | 5/2014 | Al-Mulhem | E21B 17/1021 166/255.1 |
| 2015/0158244 | A1 | 6/2015 | Tibbits et al. | |
| 2015/0285607 | A1 | 10/2015 | Helmore | |
| 2018/0238146 | A1* | 8/2018 | Al-Mulhem | E21B 41/0035 |
| 2019/0367692 | A1* | 12/2019 | Zhou | B33Y 80/00 |
| 2020/0170848 | A1* | 6/2020 | Dan-Jumbo | A61F 13/49007 |
| 2020/0337605 | A1* | 10/2020 | Cheng | A61B 5/14735 |
| 2021/0280767 | A1* | 9/2021 | Su | B29C 64/386 |
| 2021/0318321 | A1* | 10/2021 | Farokhzad | G06N 5/003 |
| 2021/0340866 | A1* | 11/2021 | Zhan | E21B 49/00 |

OTHER PUBLICATIONS

Li et al. "Intelligent Materials: a review of applications in 4D printing," National University of Defense Technology, Changsha, China pp. 170-185 (Year: 2016).*

Chen et al. "4D Printing Strain Self-Sensing and Temperature Self-Sensing Integrated Sensor-Actuator with Bioinspired Gradient Gaps," Advanced Science (Year: 2020).*

Tang et al. "Recent Advances of 4D Printing Technologies Toward Soft Tactile Sensors," Frontiers in Materials, vol. 8 (Year: 2021).*

Wang et al. "4D Printing reversible actuator with strain self-sensing function via structural design," Composites Part B (Year: 2021).*

Ge, Q. et al., Multimaterial 4D Printing with Tailorable Shapre Memory Polymers, Sci. Repo., 11 pages (2016).

International Search Report for PCT/IB2020/056481, 5 pages (dated Jan. 21, 2021).

Written Opinion for PCT/IB2020/056481, 8 pages (dated Jan. 21, 2021).

* cited by examiner

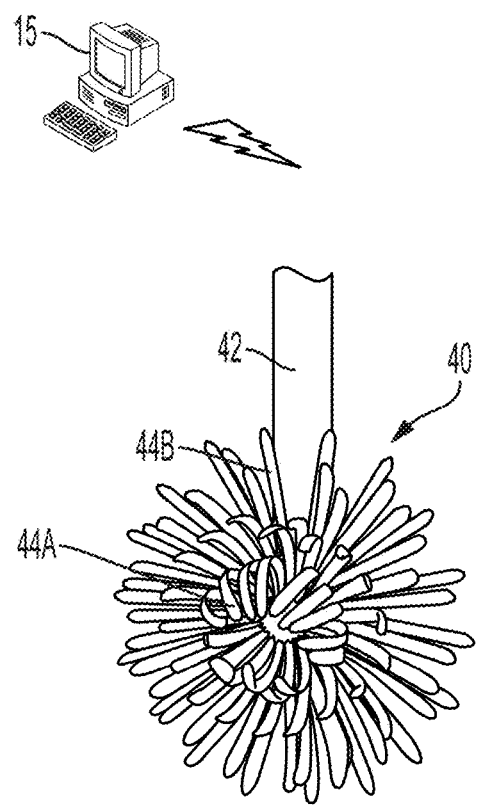
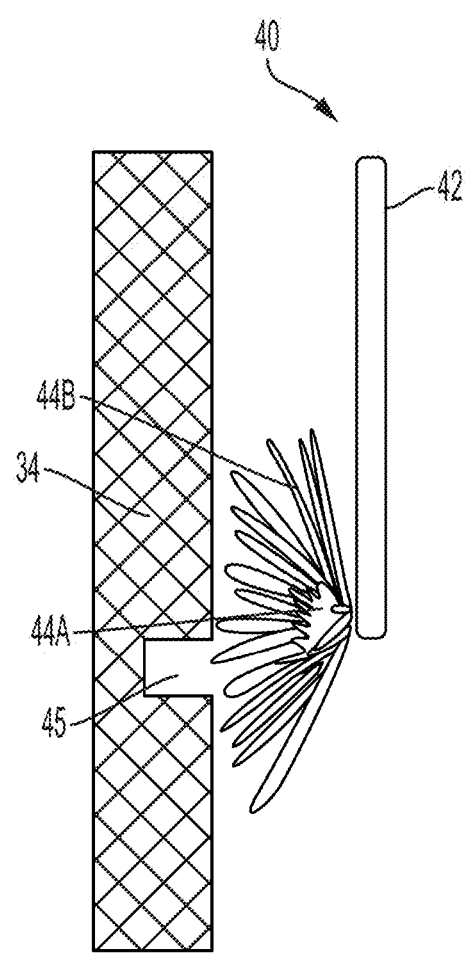
FIG. 7A
FIG. 7B

LOGGING TOOL WITH 4D PRINTED SENSING SYSTEM

FIELD

The subject matter described herein relates to apparatuses, systems, and methods for logging, sensing, or detecting conditions in a borehole in a hydrocarbon bearing rock formation.

BACKGROUND

In onshore or offshore oil or gas well operations, logging and measuring tools may be used to measure borehole or rock formation properties. The measured and recorded data (that is, a log) may indicate important information, such as cave-ins, presence or swelling of shale (fine-grained, sedimentary rock that may include mud that is a mix of flakes of clay minerals and tiny fragments), borehole geometry, or other underground conditions within the borehole. Drilling crews may use such logs to assess (for example, to quantify) one or more conditions of the borehole, for example, to assess borehole stability. Logs may also be used for determining the volume of an open hole for planning cementing operations, as well as for detecting casing deformation, bending, fractures, holes, scale deposition, paraffin build-up, and inner wall corrosion within a rock formation.

SUMMARY

The present disclosed embodiments include apparatuses, systems, and methods for measuring, monitoring, and predicting borehole geometry and underground conditions (for example, in real time) using a logging tool that includes a 4D printed sensing system.

An example system for operation in a borehole in a hydrocarbon-bearing rock formation includes a logging tool for detecting one or more conditions in the borehole. The logging tool includes a tool body and a 4D printed sensing element. The 4D printed sensing element includes a 3D printed shape-memory material configured to alter in at least one spatial dimension in response to one or more stimuli, thereby generating a data signal. The example system includes a data recording device in communication with the logging tool to receive and record one or more data signals transmitted from the logging tool. The example system may include one or more of the following features either alone or in combination.

Altering the at least one spatial dimension may cause alteration of an electrical property of the 4D printed sensing element, thereby generating an electrical data signal. The 4D printed sensing element may be hingedly connected to the tool body. One stimulus of the one or more stimuli may be a mechanical stimulus. One stimulus of the one or more stimuli may be a change in pressure, temperature, electric field, chemical composition of a borehole wall, or chemical composition of a fluid surrounding the 4D printed sensing element.

The logging tool may be mounted on a drill string, and the drill string may include a drill bit for drilling the borehole. The logging tool may be disposed adjacent to the drill bit at a distal end of the drill string. The logging tool may include a 3D printer configured to print one or more 4D printed sensing elements during downhole operation of the logging tool. The 4D printed sensing element may include polyimide, Teflon™, Kapton®, or Parylene™. The example system may include 1, 2, 3, 4, 5, 10, 20, 30, 40, 50, or 100 4D printed sensing elements An example method for detecting one or more conditions in a borehole in a hydrocarbon-bearing rock formation includes deploying a logging tool in the borehole. The logging tool includes a tool body and a 4D printed sensing element. The 4D printed sensing element includes a 3D printed shape-memory material configured to alter in at least one spatial dimension in response to one or more stimuli, thereby generating a data signal. The example method includes altering the 4D printed sensing element in at least one spatial dimension in response to one or more stimuli. The example method includes transmitting, to a data recording device in communication with the logging tool, one or more data signals. The example method may include one or more of the following features either alone or in combination.

Altering the at least one spatial dimension may cause alteration of an electrical property of the 4D printed sensing element, thereby generating an electrical data signal. The 4D printed sensing element may be hingedly connected to the tool body.

The example method may include lowering the logging tool downhole into the borehole, subsequently retracting the logging tool uphole, and recording the one or more data signals while retracting the logging tool uphole. The logging tool may be disposed adjacent to a drill bit at a distal end of a drill string. The method may include recording the data during a drilling operation.

The logging tool may include a 3D printer configured to print one or more 4D printed sensing elements during downhole operation of the logging tool. The example method may include printing one or 4D printed sensing elements. The example method may include contacting a wall of the borehole with a 4D printed sensing element.

The example method of may include contacting a wall of the borehole with a plurality of 4D printed sensing elements simultaneously. The example method may include altering a first a 4D printed sensing element in at least one spatial dimension in response to a first stimulus and altering a second 4D printed sensing element in at least one spatial dimension in response to a second stimulus. The example method may include altering a first a 4D printed sensing element in at least one spatial dimension in response to a first stimulus or in response to a second stimulus.

Throughout the description, where an apparatus, systems or embodiments are described as having, including, or comprising specific components, or where methods are described as having, including, or comprising specific steps, it is contemplated that, additionally, there are systems, apparatuses or embodiments of the present invention that consist essentially of, or consist of, the recited components, and that there are methods according to the present invention that consist essentially of, or consist of, the recited processing steps.

It should be understood that the order of steps or order for performing certain action is immaterial as long as the invention remains operable. Moreover, two or more steps or actions may be conducted simultaneously.

The following description is for illustration and exemplification of the disclosure only, and is not intended to limit the invention to the specific embodiments described.

The mention herein of any publication, for example, in the Background section, is not an admission that the publication serves as prior art with respect to any of the present claims.

The Background section is presented for purposes of clarity and is not meant as a description of prior art with respect to any claim.

BRIEF DESCRIPTION OF THE DRAWINGS

A full and enabling disclosure of the present disclosed embodiments, including the best mode thereof, directed to one of ordinary skill in the art, is set forth in the specification, which makes reference to the appended figures, in which:

FIGS. 7A and 7B illustrate a perspective view and a side view of an example logging tool with 4D printed sensing system within a borehole, according to aspects of the present embodiments;

Like reference numerals in the figures indicate like elements.

DESCRIPTION OF CERTAIN EMBODIMENTS

Figure 1:
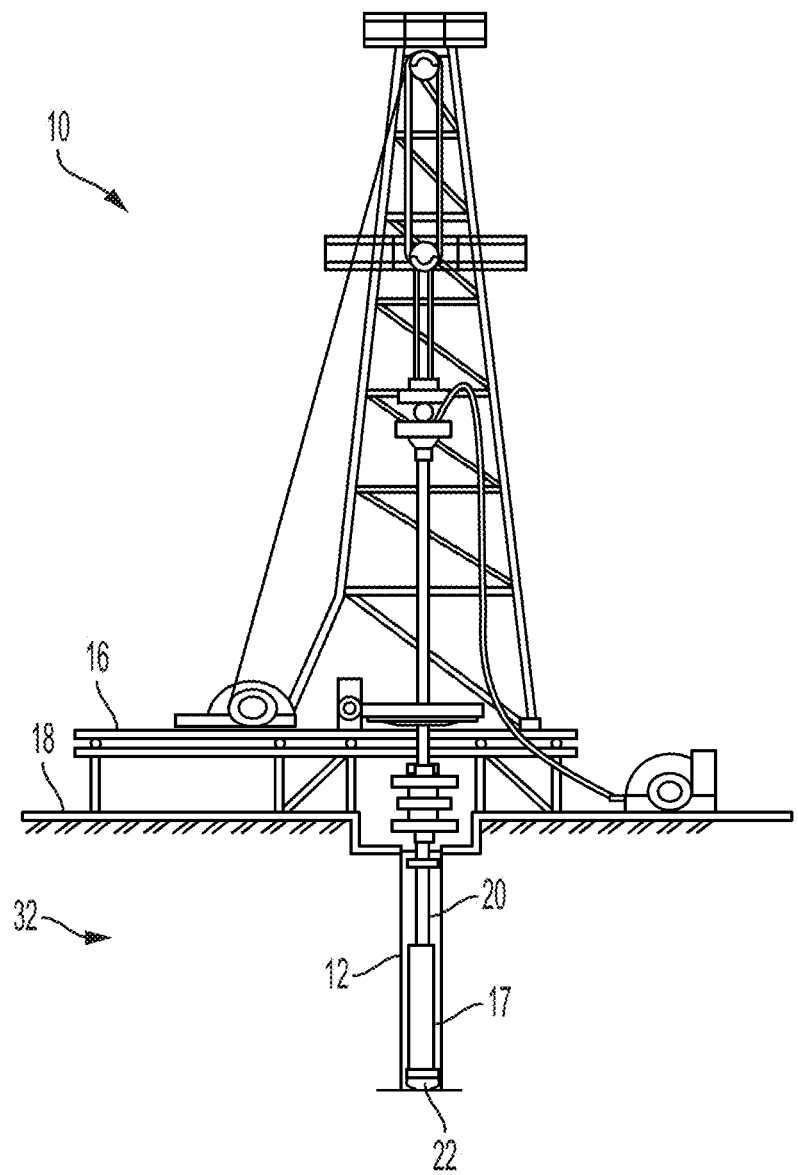
FIG. 1 illustrates a side view of an example drilling rig for drilling a borehole in a rock formation.

Reference will now be made in detail to the present disclosed embodiments, one or more examples of which are illustrated in the accompanying drawings. The detailed description uses numerical and/or letter designations to refer to features in the drawings. Like or similar designations in the drawings and description have been used to refer to like or similar parts of the present embodiments.

In onshore or offshore oil or gas well operations, a log may be obtained using mechanical caliper logging tools or using (Ultra)-sonic devices. A logging tool may be lowered into an existing hole. Data may be recorded during retrieval (uphole movement) of the tool. Data from the logging tool may be transmitted to a data recording device. The measurement of one or more physical quantities in or around a borehole versus its depth or time, or both, may be transmitted to the surface by a wireline or mud pulses, or may be recorded downhole and retrieved later when the measuring instrument is brought to the surface. A log may also be obtained during drilling operations. With reference to measurements-while-drilling (MWD) or logging-while-drilling (LWD), data may be transmitted to the surface, for example, to a data recording device, shortly after being recorded (for example, in real-time). Only a subset of the recorded data may be transmitted as real-time data due to limited data rate of MWD telemetry systems.

This specification describes examples of a logging tool with a "four-dimensional" (4D) printed sensing system. An example logging tool may be introduced into a borehole in a hydrocarbon bearing rock formation. A logging tool may operate to measure and record one or more conditions in the borehole, including physical properties of a borehole (for example, size or shape), physical or chemical properties of the rock formation, or environmental conditions in the borehole. A logging tool may include one or more 4D printed sensing systems, for example, one or more 4D printed calipers. An example 4D printed sensing system may include one or more 4D printed sensing elements, for example, 4D printed calipers, that may have been produced using a three-dimensional (3D) printing technology. An example 4D printed sensing system may include 1, 2, 3, 4, 5, 10, 20, 30, 40, 50, or 100 4D printed sensing elements. Production of a sensing element may occur prior to installation on a logging tool, or may occur on or in the logging tool itself, for example, during a measurement operation. An example 4D printed sensing system may include one or more sensing elements (for example, one or more 4D printed calipers) that may change in a physical characteristic (for example, deform) in response to one or more stimuli. The change in physical characteristic may result in a change of an electrical characteristic (for example, resistance) in or on a 4D printed sensing element. The change in physical characteristic may be proportional to the change of an electrical characteristic (for example, resistance) in or on a 4D printed sensing element. A 4D printed sensing element may be connected to an electrical circuit such that the change in physical characteristic may be converted into a signal, for example, an electrical signal. One or more signals may be converted into a data output that may be recorded. Such a record may be or may include a log, for example, a caliper log. An example caliper log obtained from the technologies described in this specification may be or may include representations of borehole diameter or shape, temperature, pressure, temperature, geometry, moisture, light, or obstacles of or in a borehole or a casing string within a borehole.

In some example implementations, a caliper log may be a representation of measured diameter(s) of a borehole or a casing string within a borehole. An example caliper logging tool may have a tool body and one or more of caliper arms (for example, 4D printed caliper arms) extending (for example, radially) from the tool body. The one or more caliper arms may extend (further) or move relative to the tool body as the logging tool moves along the borehole, for example, moves uphole or downhole. The movement of each caliper arm relative to the tool body may be converted into an electrical signal, for example, by a potentiometer attached to each arm. The signal may be recorded or transmitted to the surface. In some implementations, to account for irregular borehole geometries, for example, non-circular cross-sections, a caliper logging tool may have multiple arms (that is, a multi-arm caliper) to measure borehole dimension at several different locations simultaneously.

A borehole that may be assessed using the technologies described in this specification may be produced using a drilling rig. FIG. 1 illustrates a side view of an example drilling rig 10 for drilling a borehole 12 in a rock formation 32. Work crew may work on the rig floor 16 on the surface 18 to drill the borehole 12 by using a drill string 20. The drilling rig 10 may include a rig floor 16 and one or more tools used to turn the drill bit 22 within the borehole 12 for drilling (that is, crushing, breaking, or cutting rocks) within the rock formation 32. An example drill string 20 may include a drill pipe, a bottom hole assembly (BHA) 17 that may include, for example, a stabilizer, a mud motor (not shown) using hydraulic horsepower of a drilling fluid to drive the drill bit 22, and a drill collar (not shown) for providing weight on the drill bit 22. As the depth of borehole 12 increases, it may become more challenging to control operation of drill bit 22. For example, depending on depth and type of rock, a drill bit 22 may not follow a desired straight path for a cylindrical borehole. Drilling operations may result in spiral boreholes due to certain drilling conditions (for example, a dented drill bit), resulting in a corkscrew shape (that is, a spiraling shape) or a grooved borehole wall.

Figure 2:
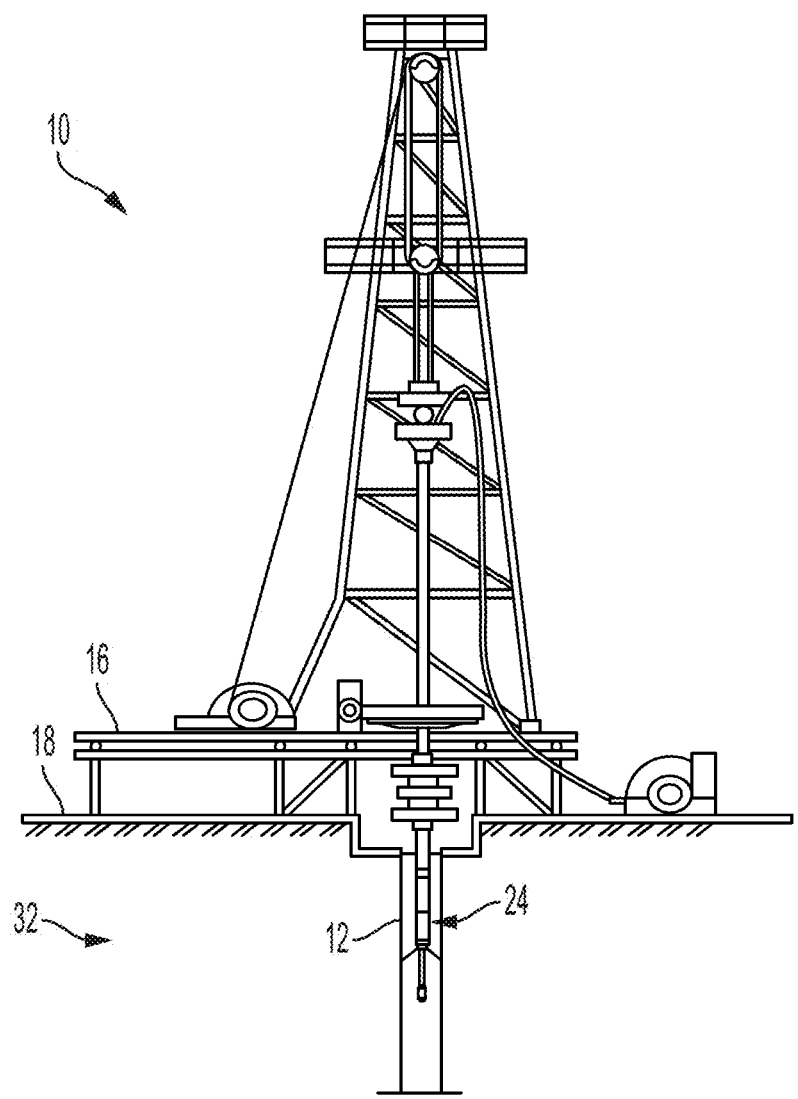
FIG. 2 illustrates a side view of an example drilling rig including a caliper logging tool.

Borehole conditions may be assessed using a logging tool as described in this specification. FIG. 2 illustrates a side view of an example drilling rig 10 including an example caliper logging tool 24. Work crew may lower a caliper logging tool 24 into a borehole 12 to a predetermined depth and then pull the caliper logging tool 24 (uphole) through the borehole 12. Example caliper logging tool 24 may record data relating to the geometry (such as the diameter) or underground conditions of the borehole 12 during uphole movement. In another embodiment (not shown), an example caliper logging tool 24 may be operatively integrated into the drill string 20 for MWD or LWD operations. The measured data may be transmitted to surface 18 in real time or may be retrieved or read after being recorded, for example, on a data storage device included in the logging tool.

Figure 3:
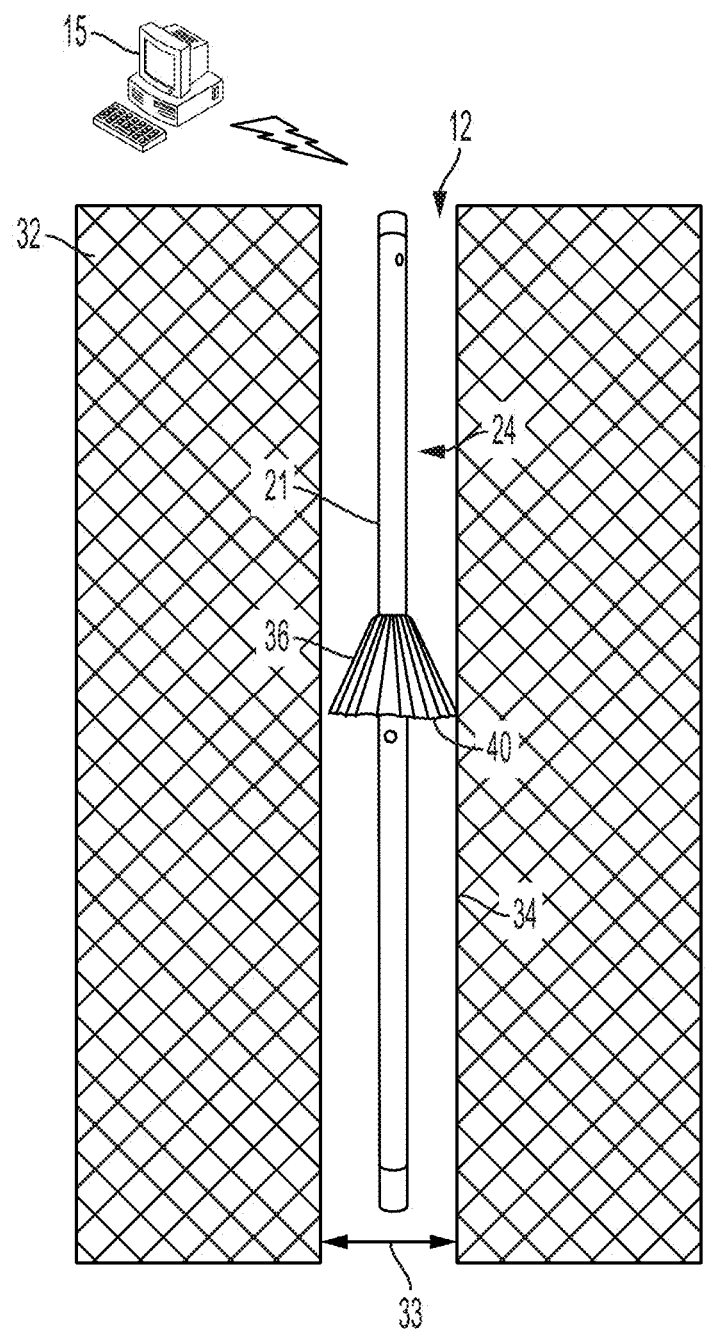
FIG. 3 illustrates a side view of an example caliper logging tool.

FIG. 3 illustrates a side view of an example caliper logging tool 24. A caliper logging tool 24 may include a tool body, for example, central shaft 21, and one or more sensing elements, for example, a plurality of articulated (for example, spring-driven) arms 36 that may be connected, for example, hingedly attached to, central shaft 21 at a base of each arm. Articulated arms 36 may move, for example, retract or extend, operatively during logging. Each of the one or more arms 36 may move radially around an attachment point (a hinge) as the tool is withdrawn uphole thorough the borehole. Movement of each arm 36 may be converted into an electrical signal, for example, using a potentiometer, that may be recorded. A caliper logging tool may be configured such that a tip 40 of each arm is in contact with a borehole wall 34. The extent of movement may thus depend on the distance between the attachment point of an articulated arm 36 to shaft 21 and a borehole wall 34. In some implementations, a tip 40 of an articulated arm 36 may be attached to a sensor (not shown), for example, for converting the position, motion or displacement of the tip 40 of the articulated arm 36 into an electrical signal. In some implementations, a caliper logging tool 24 may be lowered downhole into the borehole 12 and pulled towards the surface (uphole), for example, to measure diameter 33 of the borehole 12. In some implementations, one or more articulated arms 36 may be actuated operatively (including mechanically, hydraulically, or electrically) to contact the borehole wall 34 during the uphole movement. The position, motion, or displacement of the articulated arms 36 may be recorded and converted to an electrical signal by one or more transducer(s). The electrical signal may be transmitted to the ground by a wireline (not shown) or other tools, and a caliper log may be printed or recorded as a continuous series of values of diameter 33 of the borehole 12 versus the borehole depth or time. The electrical signal may be transmitted to a control unit 15 including a processor, to receive, manipulate, or display data, for example, on a graphical user interface (GUI).

Figure 4:
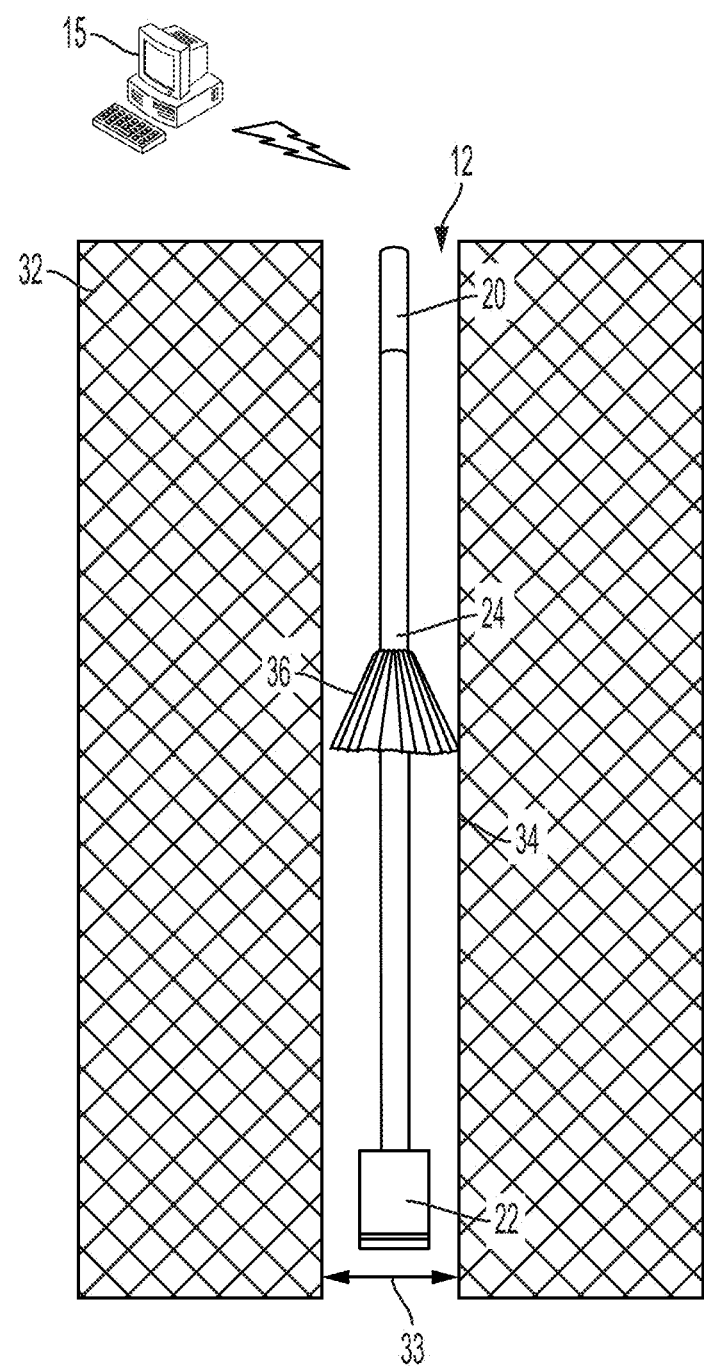
FIG. 4 illustrates a side view of an example caliper logging tool.

Operation of such a caliper logging tool may require pulling all drilling tools out of the borehole 12 before placing the caliper logging tool 24 into the borehole 12, which may be time consuming (for example, one to two days) and may not provide the real-time data for the log. In some implementations, logging may be performed during a drilling operation. FIG. 4 illustrates a side view of an example caliper logging tool 24 mounted on a drill string 20 for MWD or LWD operations. In some example implementations, articulated arms 36 may be or include mechanical or other transducers (for example, ultrasonic transducers) disposed at or near the downhole end of the drill string 20. In some implementations an example caliper logging tool 24 and drill bit 22 may be disposed adjacent to each other at the downhole end of the drill string 20 for MWD or LWD operations.

Figure 5A:
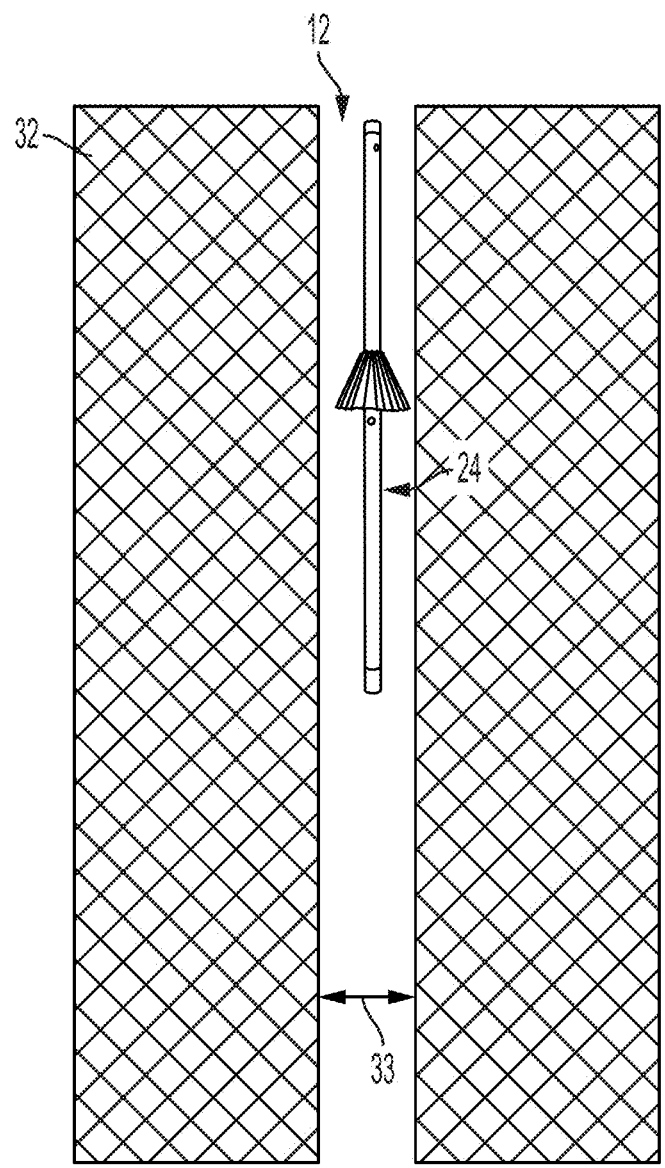
FIG. 5A illustrates a cross-section view of an example caliper logging tool in a borehole within a rock formation.
Figure 5B:
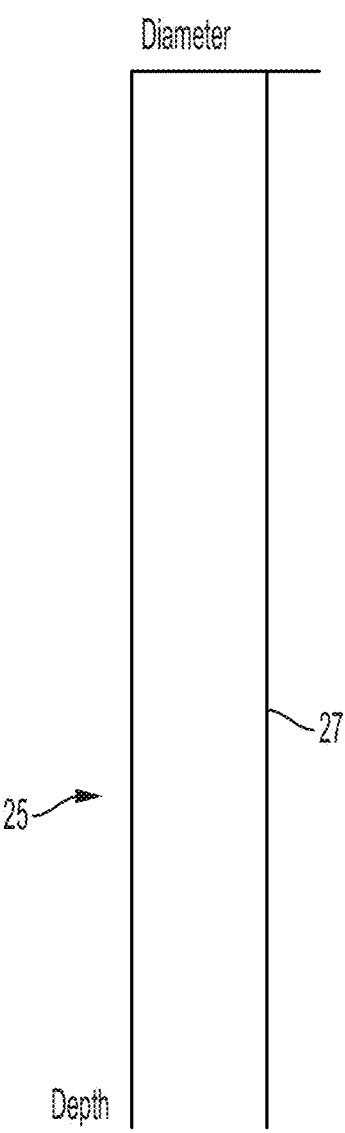
FIG. 5B is graph of an example log.

FIG. 5A illustrates a cross-section view of an example borehole 12 within a rock formation 32 (for example, shale). An example log 25 (FIG. 5B) may represent a series of values, for example, of borehole diameter 33 versus depth of the borehhole 12 or time (not shown). In some implementations, a borehole wall 34 may be smooth, and the diameter 33 may be constant throughout the borehore 12, resulting in a straight line 27 on the log 25.

Figure 6A:
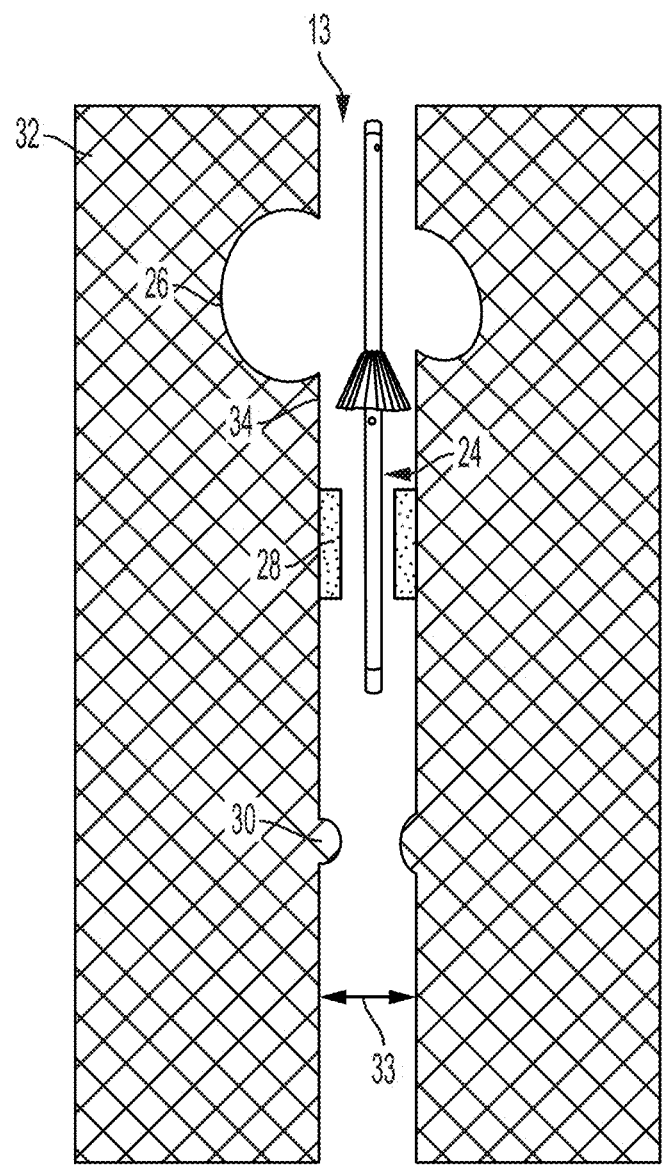
FIG. 6A illustrates a cross-section view of an example caliper logging tool in a borehole within a rock formation.
Figure 6B:
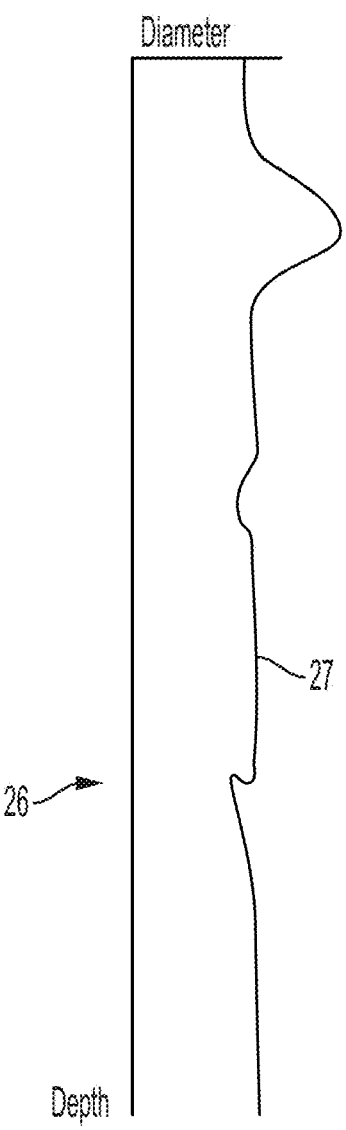
FIG. 6B is graph of an example log.

FIG. 6A illustrate a cross-section view of an example borehole 13 within a rock formation 32 (for example, shale). An example log 26 may represent a series of values, for example, of borehole diameter 33 versus depth of the borehole 13 or time (not shown). In some implementations, the geometry (for example, diameter, size, or shape) of borehole wall 34 may not be smooth at some depths of the borehole 13 due to underground conditions, such as (but not limited to) caves 26, mud cakes 28, or sloughings 30, resulting in variations in diameter 33 over a depth interval represented as a curve with spikes on the log 25.

Challenges in caliper logging may include spiral boreholes, which may be caused by certain drilling conditions (for example, a dented drill bit), resulting in a corkscrew shape (that is, a spiraling shape) or in a borehole wall with grooves. In some implementations, a caliper logging tool may measure the distance between the grooves and record erratic or periodical waves on the log. In some implementations, the caliper logging tool may not detect and record the grooves, for example, because the arms follow one or more grooves in the borehole wall as the logging tool moves upward. This phenomenon may result an inaccurate log.

In another example, the circumference of a borehole may not be a near perfect circle after drilling. For example, a borehole may be have an oval cross-section after drilling, and its circumference may be elliptical. A caliper logging tool may overestimate or underestimate the size of the borehole if articulated arms only record the major or minor axes of an example elliptical borehole. Increasing the number of arms on a caliper may increase accuracy in measurement of size or shape of the borehole.

This specification describes examples of a logging tool with a 4D printed sensing system for measuring, monitoring, or predicting the geometry or underground conditions (for example, geometry, size, shape) of a borehole by using 4D printing technology. Compared to traditional 3D printing (or additive manufacturing), which builds three-dimensional objects from a digital file, 4D printing may add the dimension of transformation of the shape or structure of the material over time. Moreover, multiple sensing capabilities may be integrated into a (single) sensing system, for example, integrating temperature or pressure measurements into a borehole size measurement element, for example, a 4D printed caliper arm. A logging tool with a 4D printed sensing system may be operatively integrated into a drill string or other nearby drilling tools for logging while drilling, for example, in real time.

In some implementations, 4D printed objects (for example, 4D printed caliper arms) may be made from materials that may be printed by a 3D printer or that may self-assemble. In some implementations, one or more 4D printed materials may have the capability to change their shape or structure (for example, color, acoustic properties, or electrical resistance) over time in response to one or more stimuli (for example, mechanical stimuli) or underground conditions (for example, pressure, temperature, chemical composition of borehole fluid, geometry, moisture, light, or obstacles). Example materials may include 4D or 3D printable shape-memory polymers. Example materials that may be used with the technologies described in this specification include polyimide, Teflon™, Kapton®, or Parylene™), ceramics (for example, PZT, oxides, or non-oxides), nanomaterials (for example, nanotubes, graphene, nanofiber, and nanorods), composites, liquid crystal elastomers, or new sensing materials. In some implementations, 4D printed materials may be or may include shape memory materials. In some implementations, 4D printed materials may not be shape memory materials. In some implementations, 4D printed materials may be or may include electric or magnetic "smart" materials. An example electric smart material may change its size or shape (or both) depending on the strength or direction (or both) of an external electric field. In an example implementation, polystyrene or polypyrrole (PPy) or combinations thereof can be used. In some implementations, these materials may be doped with tetrafluoroborate. This doping may contribute to shrinkage or expansion under electric stimulation.

In some implementations, one or more 4D printed caliper made from these materials may be actuated or moved using electrical impulses. In some implementations, multiple caliper arms on a device may be actuated using an electric impulse. For example, an electric impulse may cause one caliper arm to stretch, and subsequent removal of the stimulus may causing another leg to move, for example, to stretch or otherwise move (for example, forward). In some implementations, carbon nanotubes, which are highly conductive, may be used for the construction of a caliper arm. In some implementations, a caliper arm may be or may include composite material, for example, carbon nanotubes or (other) shape memory materials and may include a material such as iron particles. Such a composite material may have a higher conductivity and electroactive reaction speed than two separate materials. Magnetic-reactive iron gels contract when a strong magnetic field is present. In some implementations, a 4D printed caliper arm may be or include a combination of carbon nanotubes and magnetic reaction particles to facilitate real-time caliper measurements while maintaining robust performance. In some implementations, a 4D printed caliper arm may be or include a super-elastic polymer including one or more embedded sensors. In an example implementation, these sensors may send data back to an artificial intelligence-enhanced control panel that may cause alteration of a caliper arm configuration to respond to current downhole conditions.

In some implementations, one or more sensing elements may be produced using a 3D printer. In some implementations, a 3D printer may be disposed on the surface. An example 3D printed sensing element (for example, a 4D printed sensing element) may be printed prior to installation on or in a logging tool. In some implementations, a 3D printer may be operatively integrated into a logging tool as described in this specification for printing while logging. An integrated 3D printer may be configured to or capable of producing one or more sensing elements downhole during operation. An integrated 3D printer may include or may be connected to a control unit including a processor, for example, a control unit at the surface. An integrated 3D printer may be configured to or capable of producing one or more sensing element in response to data input from the control unit, for example, based on a user input or based on sensor data, for example, data recorded by a data recording device. A 3D printer may use a heating element, for example, to melt one or more polymers that may be used to produce one or more sensing elements. In some implementations, a heat source for the 3D printer may be a laser or other heating technology.

An example logging tool with a 4D printed sensing system may include a tool body and a plurality of arms, for example, 4D printed caliper arms extending (for example, radially) from the tool body that may extend (further) or move relative to the tool body as the logging tool moves along the borehole. In some implementations, one or more 4D printed caliper arms may move radially around an attachment point (a hinge) as the tool is moved, for example, withdrawn uphole thorough the borehole. Movement may be converted into an electrical signal, for example, using a potentiometer. In some implementations, one or more 4D printed caliper arms may have a base attached to the body of the logging tool such that the base remains static as the is moved, for example, withdrawn uphole thorough the borehole. A 4D printed caliper arm may be configured to alter in at least one spatial dimension, for example, in response to one or more stimuli. A 4D printed caliper arm may be flexible and deform (for example, bend) as the tool is moved, for example withdrawn uphole through the borehole. The bending movement may be measured, for example, converted into an electrical signal, for example, using a strain gauge or other such device. In some implementations, deformation of a 4D printed caliper arm may cause a change in electrical properties of the caliper arm, which may be detected using an electrical circuit connected to the caliper arm that converts change in change in electrical properties into an electrical signal. In some implementations, deformation of a 4D printed caliper arm may occur in response to a mechanical stimulus (for example, movement or acceleration), or may occur in response to another stimulus, including (change in) pressure, temperature, electric field, magnetic field, chemical composition of a borehole wall, chemical composition of a fluid surrounding a 4D printed sensing element, for example, a 4D printed caliper arm. In some implementations, a 4D printed caliper arm may be configured to or capable of responding to two or more stimuli. For example, an example 4D printed caliper arm may be hingedly connected to a tool body, for example, for the entire arm to move in response to a change in borehole diameter. The example 4D printed caliper arm may itself be deformable, for example, in response to borehole temperature. An example log generated based on measurements obtained using the example caliper may show variation of borehole dimension and temperature along a depth of a borehole.

An example logging tool including a plurality of 4D printed caliper arms is shown in FIGS. 7A and 7B, which illustrate a perspective view (FIG. 7A) and a side view (FIG. 7B) of an example logging tool 40 near a borehole wall 34. An example logging tool 40 may include a tool body, for example, a shaft 42 to which a plurality of 4D printed caliper arms (for example, 44A and 44B) of known dimension (for example, diameter or length) are attached. Example caliper arms 44 may be printed by a 3D printer on the surface. Example caliper arms 44 may be arranged in a circular configuration forming a face. In some implementations, the plane of a face is parallel to a plane of a borehole (for example, a plane of a cylindrical borehole). In some implementations, the plane of a face is perpendicular to a plane of a borehole (for example, a plane of a cylindrical borehole), for example, as shown in FIG. 7B. During operation, an example logging tool 40 may be moved (for example, pulled) along borehole wall 34. Each arm, for example, arms 44A or 44B, may alter in at least one spatial dimension, for example, each arm may individually or independently deform, self-assemble or otherwise change shape (for example, bend, shrink, expand), length, color in response to one or more stimuli or underground conditions, for example, electrical or magnetic fields, or hydraulic mechanisms (for example, fluid pressure or fluid shear force). A degree of deformation, self-assembly, or structural change of each articulated 4D printed arm, for example, arm 44A or 44B, may be adapted to the intensities of the stimulus or underground conditions. In some implementation, a caliper arm 44 may remain rigid or fully extended during a first type of operation, for example, to measure wellbore diameter. During this first type, a caliper arm may move relative to shaft 42 but may not deform (for example, bend). During a second type of operation, the (same) caliper arm 44 may deform in response to an external stimulus, for example, temperature or pressure. Caliper arms 44 may be connected to a data recording device and a control unit, for example, a control unit 15 including a processor, to receive, manipulate, or display data, for example, on a graphical user interface (GUI). In some implementations, one or more caliper arms may include a strain gauge, for example, a strain gauge that is electrically connected to control unit 15. In some implementations, one or more caliper arms may include one or more magnetic sensors that are electrically connected to control unit 15. In some implementations, one or more caliper arms may include one or more capacitive sensor with one electrode fixed relative to tool body and another electrode on a moving caliper arm. In some implementations, data may be transmitted (for example, from a tool to an uphole control unit) via mud pulse telemetry, acoustic means (for example, sound waves transmitted through wellbore fluid), or electromagnetic means (for example, an electric connection, for example, using wired drill pipes). An example tool may include a plurality of arms 44 (for example, 10, 20, 30, 40, or more arms) such that a plurality of data points may be obtained at each point along a length of a borehole. Such a plurality of data points may provide simultaneous information over an area of a borehole wall, which may be used to detect complex features, such as a groove 45.

Figure 8:
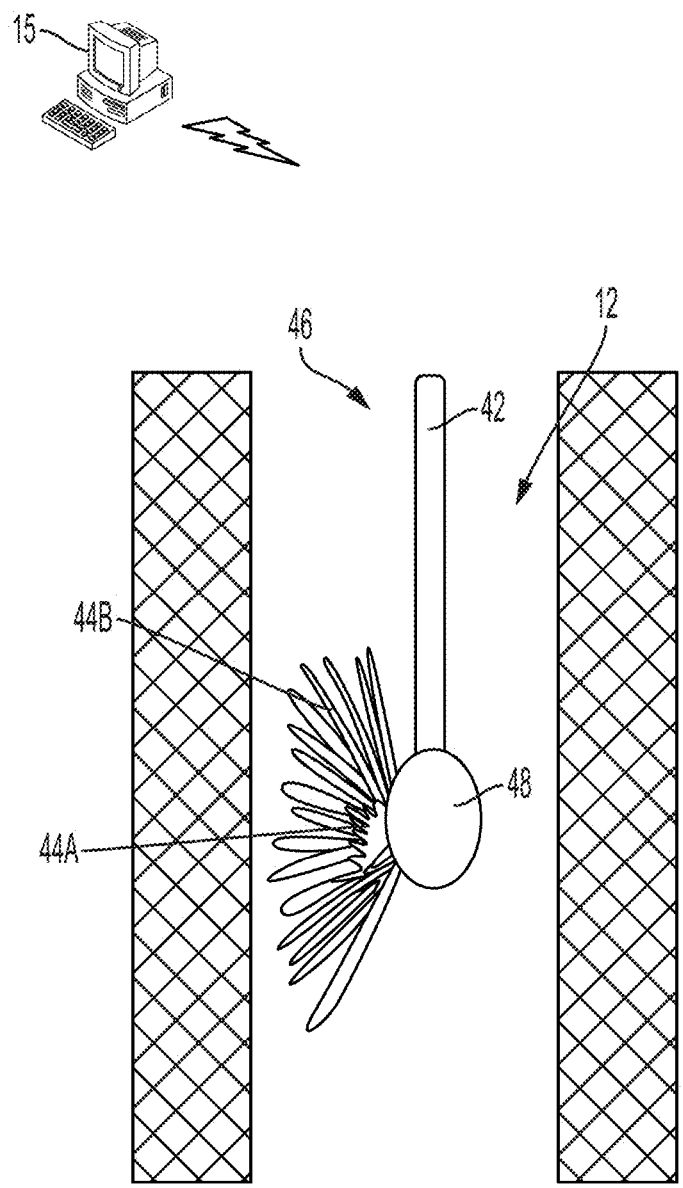
FIG. 8 illustrates a side view of an example logging tool with a 4D printed sensing system, according to aspects of the present embodiments.

An example logging tool including a plurality of 4D printed caliper arms and a 3D printer is shown in FIG. 8. An example logging tool 46, may include a body, for example, a shaft 42 connected to a 3D printer 48. A 3D printer 48 may be configured to print a plurality of articulated 4D printed arms (for example, arms 44A and 44B) within a borehole for example, in real time. A 3D printer to be used downhole printing in real time may be of a particular size to fit the size of the borehole 12. The 4D printed arms may be printed within the borehole, for example, in real time, for logging, or be printed on the flexible substrates produced by a 3D printer on the ground.

Figure 9:
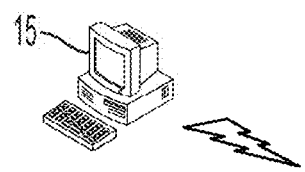
FIG. 9 illustrates a side view of an example logging tool with a 4D printed sensing system, according to aspects of the present embodiments.
Figure 9:
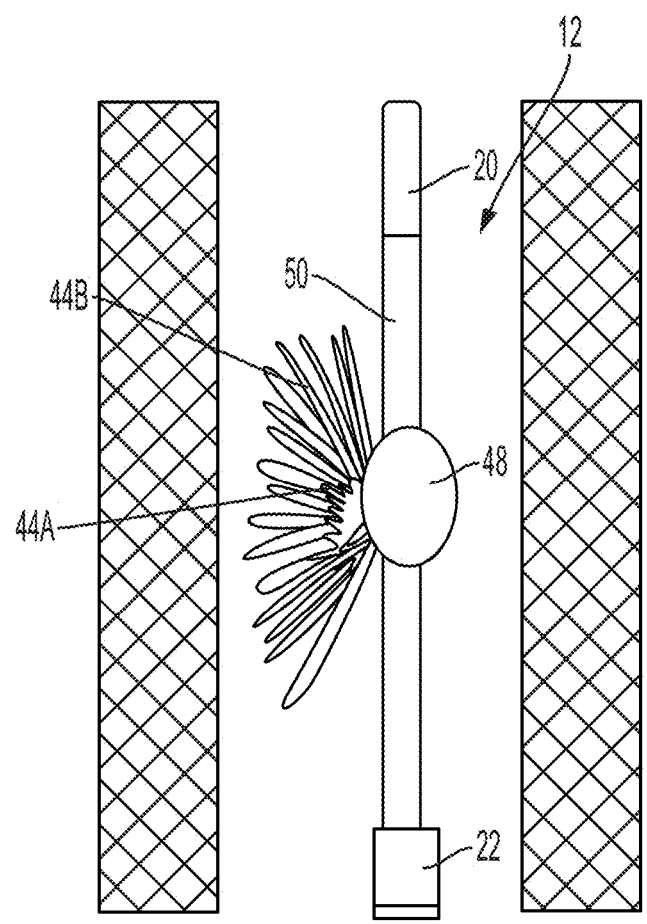

An example drill string with logging tool including a plurality of 4D printed caliper arms and a 3D printer is shown in FIG. 9. An example logging tool 50 may be part of a drill string 20 that may include a drill bit 22 at the downhole end of the drill string 20. Example arms 44 may be printed from the 3D printer 48 for 4D printing and logging while drilling within a borehole, for example, in real time.

In some implementations, an example logging tool may include a sensing element (for example, a 4D printed sensing element) that is or includes a proximity sensor. An example proximity sensor may be configured to or be capable of detecting the presence of an object within a borehole (for example, rock or debris) at a certain distance (for example, less than 10 centimeters (cm), less than 5 cm, or less than 1 cm) from a surface of a logging tool. Sensor technologies that may be used for this purpose include ultrasonic sensors, capacitive sensors, optoelectronics, and inductive or magnetic sensors. Proximity sensors (e.g., ultrasonic sensors) or image sensors (e.g. cameras) may be used in combination with visual software (for example, OpenCV) to track one or more objects. In some implementations, a distance between a borehole object and a surface of a logging tool may be measured using one or more of an ultrasonic sensor, capacitive sensor, optoelectronics, and inductive or magnetic sensor. An example sensor may be configured to detect changes in the capacitance between one or more on-board electrodes and an object either in direct contact or at a distance from the logging too (for example, a distance of less than 10 cm). In some implementations, motion of a borehole object may be detected or monitored using one or more of an infrared light optical sensor, sound-based sensor (for example, a sonar-based sensor), an ultrasound-based sensor (for example, an ultrasonic sonar-based sensor) or a microwave/radar technology-based sensor.

In some example implementations, an example logging tool may include a sensing element (for example, a 4D printed sensing element) that is or includes an image sensors, for example, a digital camera, a camera lens, or other imaging devices based on charged coupled devices (CCD) or complementary metal oxide semiconductor (CMOS) technology. In some example implementations, a sensing element of a 4D printed sensing system may be or include a sensing element that is or includes a light sensor. A light sensor may be part of a proximity sensor. A light sensor as used with the technologies described in this specification may be based on detection of changes in voltage in a photoresistor or a photovoltaic cell in in response to a change in amount of light detected. In some example implementations, a sensing element of a 4D printed sensing system may be or include a sensing element that is or includes a color sensor. Different colors may be reflected with different intensity, for example, the orange color reflects red light in an amount greater than the green color. A color sensor may be used to detect or monitor an object with a certain color. In some example implementations, a sensing element of a 4D printed sensing system may be or include a sensing element that is or includes a laser sensor. Laser light may be used for tracking or detection a target located at a greater distance, for example, more than 10 cm from a surface of a logging tool. The distance between sensor and target may be measured by calculating the time difference between light emitted by the logging tool and the time that light reflected by an object is received by detector on or in the tool. In some example implementations, a sensing element of a 4D printed sensing system may be or include a sensing element that is or includes an infrared sensor. An example infrared sensor may measure infrared light emitted or reflected by a borehole object. In some example implementations, a sensing element of a 4D printed sensing system may be or include a sensing element that is or includes an ultrasonic sensor. In some implementations, a sensing element may generate ultrasound frequency sound waves and may receive and detect the sonic echo reflected by a target object.

In some implementations, a sensing element of a 4D printed sensing system may be or include a sensing element that is or includes a sensor to detect one or more environmental condition, for example, temperature, pressure, or humidity.

At least part of the logging tool and its various modifications may be controlled by a computer program product, such as a computer program tangibly embodied in one or more information formation carriers. Information carriers include one or more tangible machine-readable storage media. The computer program product may be executed by a data processing apparatus. A data processing apparatus can be a programmable processor, a computer, or multiple computers.

A computer program may be written in any form of programming language, including compiled or interpreted languages. It may be deployed in any form, including as a stand-alone program or as a module, component, subroutine, or other unit suitable for use in a computing environment. A computer program may be deployed to be executed on one computer or on multiple computers. The one computer or multiple computers can be at one site or distributed across multiple sites and interconnected by a network.

Actions associated with implementing the systems may be performed by one or more programmable processors executing one or more computer programs. All or part of the systems may be implemented as special purpose logic circuitry, for example, an field programmable gate array (FPGA) or an ASIC application-specific integrated circuit (ASIC), or both.

Processors suitable for the execution of a computer program include, for example, both general and special purpose microprocessors, and include any one or more processors of any kind of digital computer. Generally, a processor will receive instructions and data from a read-only storage area or a random access storage area, or both. Components of a computer (including a server) include one or more processors for executing instructions and one or more storage area devices for storing instructions and data. Generally, a computer will also include one or more machine-readable storage media, or will be operatively coupled to receive data from, or transfer data to, or both, one or more machine-readable storage media. Machine-readable storage media include mass storage devices for storing data, for example, magnetic, magneto-optical disks, or optical disks. Non-transitory machine-readable storage media suitable for embodying computer program instructions and data include all forms of non-volatile storage area. Non-transitory machine-readable storage media include, for example, semiconductor storage area devices, for example, erasable programmable read-only memory (EPROM), electrically erasable programmable read-only memory (EEPROM), and flash storage area devices. Non-transitory machine-readable storage media include, for example, magnetic disks, for example, internal hard disks or removable disks, magneto-optical disks, and CD-ROM and DVD-ROM disks.

Each computing device may include a hard drive for storing data and computer programs, a processing device (for example, a microprocessor), and memory (for example, RAM) for executing computer programs.

Elements of different implementations described may be combined to form other implementations not specifically set forth previously. Elements may be left out of the processes described without adversely affecting their operation or the operation of the system in general. Furthermore, various separate elements may be combined into one or more individual elements to perform the functions described in this specification.

Other implementations not specifically described in this specification are also within the scope of the following claims.

These and other features, aspects and advantages of the present invention will become better understood with reference to the following description and appended claims. The accompanying drawings, which are incorporated in and constitute a part of this specification, illustrate embodiments of the present disclosure and, together with the description, serve to explain the principles of the present embodiments.

CERTAIN DEFINITIONS

In order for the present disclosure to be more readily understood, certain terms are first defined below. Additional definitions for the following terms and other terms are set forth throughout the specification.

An apparatus, system, or method described herein as "comprising" one or more named elements or steps is open-ended, meaning that the named elements or steps are essential, but other elements or steps may be added within the scope of the apparatus, system, or method. To avoid prolixity, it is also understood that any apparatus, system, or method described as "comprising" (or which "comprises") one or more named elements or steps also describes the corresponding, more limited apparatus system, or method "consisting essentially of" (or which "consists essentially of") the same named elements or steps, meaning that the apparatus, system, or method includes the named essential elements or steps and may also include additional elements or steps that do not materially affect the basic and novel characteristic(s) of the system, apparatus, or method. It is also understood that any apparatus, system, or method described herein as "comprising" or "consisting essentially of" one or more named elements or steps also describes the corresponding, more limited, and closed-ended apparatus, system, or method "consisting of" (or "consists of") the named elements or steps to the exclusion of any other unnamed element or step. In any apparatus, system, or method disclosed herein, known or disclosed equivalents of any named essential element or step may be substituted for that element or step.

As used herein, "a" or "an" with reference to a claim feature means "one or more," or "at least one."

EQUIVALENTS

It is to be understood that while the disclosure has been described in conjunction with the detailed description thereof, the foregoing description is intended to illustrate and not limit the scope of the invention(s). Other aspects, advantages, and modifications are within the scope of the claims.

This written description uses examples to disclose the invention, including the best mode, and also to enable any person skilled in the art to practice the present embodiments, including making and using any devices or systems and performing any incorporated methods. The patentable scope of the present embodiments is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for operation in a borehole in a hydrocarbon-bearing rock formation comprising:
   a logging tool for detecting one or more conditions in the borehole, the logging tool comprising a tool body and a 4D printed sensing element, the 4D printed sensing element comprising a 3D printed shape-memory material configured to alter in at least one spatial dimension in response to one or more stimuli, thereby generating a data signal; and
   a data recording device in communication with the logging tool to receive and record one or more data signals transmitted from the logging tool.

2. The system of claim 1, where altering the at least one spatial dimension causes alteration of a physical property of the 4D printed sensing element, where the 4D printed sensing element is connected to an electrical circuit, and where the alteration of the physical property is converted into an electrical data signal.

3. The system of claim 1, where the 4D printed sensing element is hingedly connected to the tool body.

4. The system of claim 1, where one stimulus of the one or more stimuli is a mechanical stimulus.

5. The system of claim 1, where one stimulus of the one or more stimuli is a change in pressure, temperature, electric field, chemical composition of a borehole wall, or chemical composition of a fluid surrounding the 4D printed sensing element.

6. The system of claim 1, where the logging tool comprises a 3D printer configured to print one or more 4D printed sensing elements during downhole operation of the logging tool, where the 3D printer is operatively integrated into the logging tool and is coupled to a surface control unit, the 3D printer comprising at least one heating element for melting one or more polymers that are used to produce the 4D printed sensing element.

7. The system of claim 1, where the 4D printed sensing element comprises polyimide, Teflon™, Kapton®, or Parylene™.

8. The system of claim 1 comprising 1, 2, 3, 4, 5, 10, 20, 30, 40, 50, or 100 4D printed sensing elements.

9. The system of claim 1, where the logging tool is mounted on a drill string, the drill string comprising a drill bit for drilling the borehole.

10. The system of claim 9, where the logging tool is disposed adjacent to the drill bit at a distal end of the drill string.

11. A method for detecting one or more conditions in a borehole in a hydrocarbon-bearing rock formation comprising:
   deploying a logging tool in the borehole, the logging tool comprising a tool body and a 4D printed sensing element, the 4D printed sensing element comprising a 3D printed shape-memory material configured to alter in at least one spatial dimension in response to one or more stimuli, thereby generating a data signal;
   altering the 4D printed sensing element in at least one spatial dimension in response to one or more stimuli, and
   transmitting, to a data recording device in communication with the logging tool, one or more data signals.

12. The method of claim 11, where altering the at least one spatial dimension causes alteration of an physical property of the 4D printed sensing element, where the 4D printed sensing element is connected to an electrical circuit, and where the alteration of the physical property is converted into an electrical data signal.

13. The method of claim 11, where the 4D printed sensing element is hingedly connected to the tool body.

14. The method of claim 11 comprising lowering the logging tool downhole into the borehole, subsequently retracting the logging tool uphole, and recording the one or more data signals while retracting the logging tool uphole.

15. The method of claim 11, where the logging tool is disposed adjacent to a drill bit at a distal end of a drill string and the method comprises recording the data during a drilling operation.

16. The method of claim 11, where the logging tool comprises a 3D printer configured to print one or more 4D printed sensing elements during downhole operation of the logging tool, the method comprising printing one or 4D printed sensing elements, where the 3D printer is operatively integrated into the logging tool and is coupled to a surface control unit, the 3D printer comprising at least one heating element for melting one or more polymers that are used to produce the 4D printed sensing element.

17. The method of claim 11 comprising contacting a wall of the borehole with a 4D printed sensing element.

18. The method of claim 11 comprising contacting a wall of the borehole with a plurality of 4D printed sensing elements simultaneously.

19. The method of claim 11 comprising altering a first a 4D printed sensing element in at least one spatial dimension in response to a first stimulus and altering a second 4D printed sensing element in at least one spatial dimension in response to a second stimulus.

20. The method of claim 11 comprising altering a first a 4D printed sensing element in at least one spatial dimension in response to a first stimulus or in response to a second stimulus.

* * * * *